Oct. 11, 1932.  O. HENNINGS  1,882,078
FILTER
Filed Nov. 20, 1930
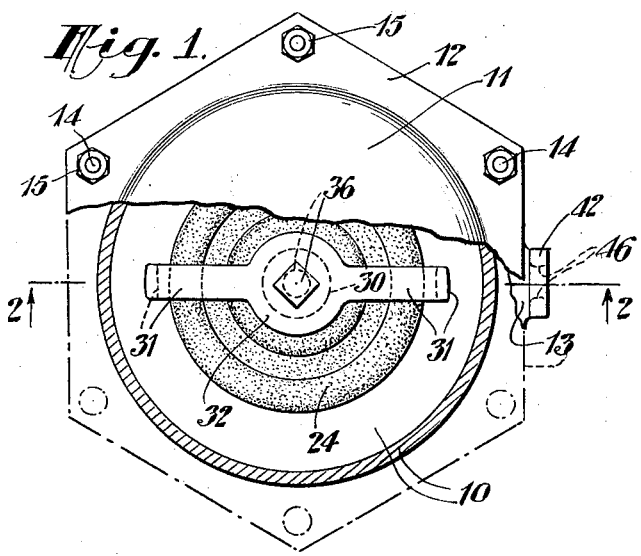
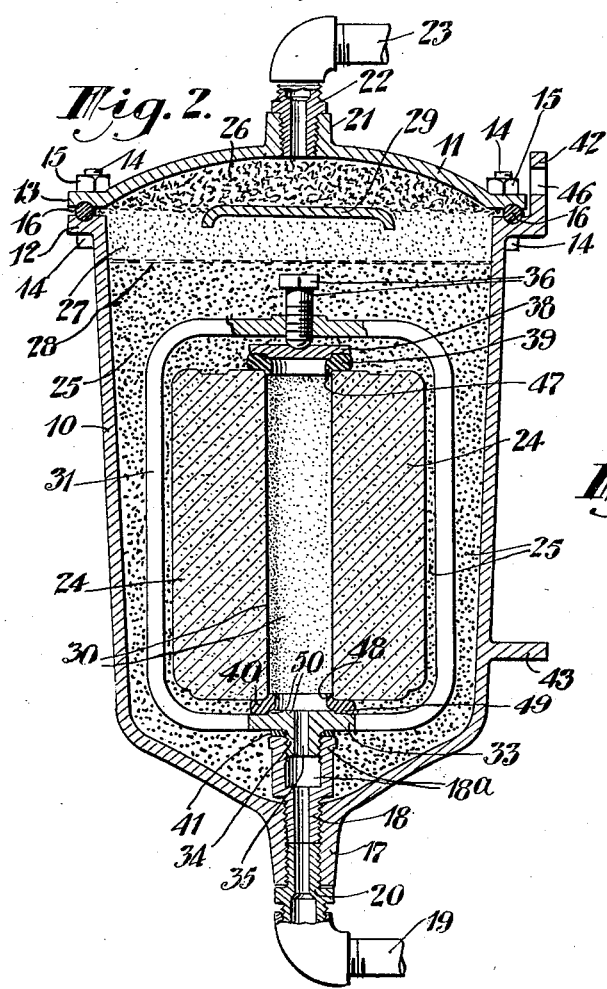
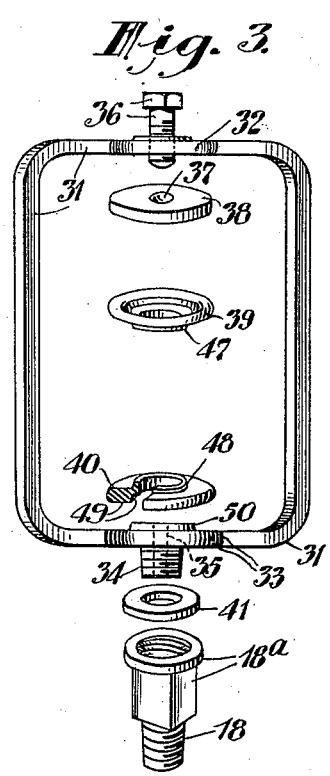
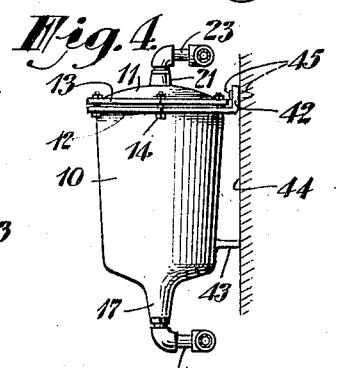
INVENTOR
OSCAR HENNINGS
BY
ATTORNEYS Patented Oct. 11, 1932

1,882,078

UNITED STATES PATENT OFFICE

OSCAR HENNINGS, OF MONTCLAIR, NEW JERSEY

FILTER

Application filed November 20, 1930. Serial No. 496,883.

This invention relates to improvements in filters and more particularly to water filters of the kind wherein the filter bed includes a permeable block of carbon or similar filtering material as the final filtering medium through which the water passes before reaching the filter outlet, said block having a bore or cavity open to the filter outlet and which the water can enter only by penetrating the carbon body of the block.

The invention contemplates the provision of improved means for removably supporting the carbon block in the filter casing spaced from the sides, top and bottom of the casing with the water discharge bore or cavity open to the filter outlet and efficiently sealed from communication with the interior of the casing except through the porous material of the block; the provision of simple and effective block supporting means for detachably clamping the block, which means is readily mountable in and removable from the casing with the block clamped therein; and the provision of a carbon block and block-holding assembly for detachably maintaining the block in the filter casing with its cavity discharge connected with the filter outlet and sealed from the interior of the casing, which assembly is so constructed that liability of derangement of the block in handling or shipping of the filter is reduced to a minimum as is liability of breaking down of the support with the resultant block derangement and block cavity seal rupture as a consequence of electrolytic action in the filter.

The invention also contemplates the provision of a detachable support or frame having a water discharge portion connectible with the filter outlet, which frame has provisions for removably clamping the carbon block therein with its bore or cavity open to the water discharge outlet of the frame and for sealing the block bore or cavity from open communication with the interior of the filter casing.

Other objects and advantages of the invention will appear from the following description in detail of a preferred embodiment thereof shown in the accompanying drawing, in which Fig. 1 is a top plan view of the filter with the cover portion of the filter casing partly broken away and all of the filter bed except the carbon block omitted;

Fig. 2 a vertical sectional view of the complete filter taken on the line 2—2 of Fig. 1;

Fig. 3 a detail view showing in perspective parts of the block mounting and the casing outlet member or nipple to which the frame is detachably connectible; and Fig. 4 a side elevation of the filter mounted on a wall.

The filter casing comprises an open top receptacle or main body portion 10 and a shallow or relatively flat dome-shaped detachable cover portion 11, the two portions having horizontal marginal flanges 12 and 13 through which extend the shanks of clamping bolts 14 having nuts 15 screwed thereon, an annular rubber gasket or packing ring 16 being clamped between the flanges.

The bottom of the casing is formed with a centrally located pendent hollow boss 17 into the upper end of which is screwed an outlet fitting or nipple 18 having an internally threaded upper portion 18ª projecting a substantial distance upward from the bottom of the casing. The discharge conduit for purified water includes a pipe 19 which may be connected by a suitable elbow union with a nipple or union 20 the upper end of which is screwed up into boss 17 tightly against the lower end of outlet nipple 18 for securely locking the latter nipple to the casing to permit screw connection and disconnection of the carbon block holding frame from the casing without disturbing nipple 18.

The casing is formed with a central upwardly extending hollow boss 21 through which is screwed the lower portion of a water inlet nipple or union member 22, the upper portion of which may be connected by a suitable elbow union with a supply pipe 23 for the water to be filtered.

The filter bed includes a hard carbon block 24, spaced from the top, bottom and sides of the casing, as the final filtering medium, the water to be filtered passing through initial filtering material packed around the block. In the particular filter shown the bed includes coarse charcoal particles packed entirely around the carbon block, as shown at 25, a layer of crushed flint 26 in the dome cover 11, a layer 27 of fine granulated carbon particles between the flint and coarse charcoal, and preferably a sheet of asbestos cloth interposed between the fine and coarse charcoal as indicated at 28. Preferably, also, a glass spreader plate 29 for the incoming water is arranged at the top of the fine charcoal layer below the water inlet.

The block 24, preferably cylindrical and formed of carbon or other suitable filtering material, has a water discharge cavity 30 preferably in the form of an axial cylindrical passage or bore as shown, and is supported in an upright position in the casing with passage 30 registering with the centrally disposed outlet nipple 18.

The block 24 is detachably clamped in a removable metal suporting frame 31 embracing the block and located wholly exteriorly of the block, said frame preferably being a rectangular one having two upright bar like portions at opposite sides of the block and united by upper and lower cross-bar portions. The frame is preferably spaced from the block at all points and is preferably formed in one piece, as shown, the cross-bars being provided with horizontally disposed disk-like enlarged medial portions 32 and 33. Portion 33 of the lower cross bar forms a disk-like supporting seat for the block 24 and this cross-bar is formed with a pendent externally threaded boss 34 centrally located with respect to seat 33 and an axial water discharge passage or bore 35 extends through said seat and boss.

An adjustable clamping bolt 36 threaded axially down through portion 32 of the upper cross-bar has its rounded lower end engaged in a shallow depression 37 of concave cross-section in the upper face of a metal clamping disk or head 38 of greater diameter than block bore 30. Fluid proof washers 39 and 40 are interposed between the upper and lower ends of the block and the clamping disk 38 and block seat 33 to seal the open ends of bore 30 from the interior of the casing and compel the incoming water to permeate the carbon block and pass into bore 30 and out through the frame pasage 35 to the casing discharge outlet 18.

Preferably, and in the filter shown these washers 39 and 40 are formed of pure rubber to afford washers that are elastic, fluid proof, free from water contaminating or taste-affecting material such as sulphur, and non-conductive of electricity. When the block and washers are asembled in the frame and bolt 36 screwed down on disk 38 to compress the washers and tightly clamp the block in the frame the ends of the block bore are sealed, and the supporting frame is electrically insulated from direct contact with the block and located wholly outside the block.

By screwing boss 34 into and out of nipple 18 the block and frame assembly may readily be connected with and disconnected from the casing. A rubber gasket 41 is preferably interposed between the upper end of nipple 18—18ª and the lower face of seat portion 33 of the lower cross bar of the frame. The casing 10—11 is preferably formed of galvanized or enameled cast iron and the frame 31, bolt 36, disk 38 and nipples 18, 20 and 22 are preferably formed of tin coated brass, to resist corrosion of the metal parts.

The improved mounting for the carbon block affords a strong and rigid detachable mounting which prevents or greatly reduces liability of derangement of the block and breaking of the seal of the water discharge from open communication with water that has not filtered through the carbon of which the block is formed. It also provides a support which prevents or greatly reduced liability of the derangement of the block and opening of a direct communication with the filter outlet for incompletely filtered water frequency occurring in prior filters of this type from breaking down of the block support or a part thereof as a result of electrolytic action in the filter.

The body portion of the filter may be provided with an attachment lug 42 extending upward from flange 12 and a horizontal spacing lug 43 extending outward from said body portion below lug 42 for attaching and supporting the filter upright on a wall 44 or other vertical support, a stud bolt 45 or other fastening extending into the wall through an aperture 46 in lug 42.

Washer 39 is preferably provided with a pendent annular flange 47 fitted in the upper end of block passage 30 to center the washer. To position or center the block in the frame out of contact with the vertical frame portions and center the passage 30 with relation to frame passage 35, washer 40 preferably has an upstanding annular flange 48 fittable in passage 30 and a pendent annular flange 49 fittable about a slightly raised central portion 50 of the block seat portion 33 of the frame.

I am not broadly claiming in this application the means for electrically insulating the filter block to prevent electrolysis; said means are claimed in a copending application Ser. No. 496,882, filed November 20, 1930.

What I claim is:

1. A filter comprising a casing having a fluid inlet and a fluid outlet, and provided with an opening for affording access to the interior of the casing and a cover for said opening, a block of permeable filtering material within the casing having a bore extending entirely therethrough, and block supporting means located wholly within the casing and insertable in and removable from the casing through said opening with the block supported thereby, said block supporting means being detachably held to the casing and connecting one end of the block bore with the fluid outlet of the casing and sealing it from the interior of the casing and also closing the opposite end of the block bore without extending through the block bore.

2. A filter as claimed in claim 1, wherein said block supporting means has a conduit portion screwed in the casing outlet and connecting the open end of the block bore with the casing outlet and is otherwise entirely spaced from all parts of the casing, said supporting means including two packing elements of fluid proof material non-conductive of electricity which engage opposite faces of the block at the ends of the block bore and are the only portions of the supporting means directly contacting the block.

3. A filter as claimed in claim 1, wherein the block supporting means comprises a rigid metal frame formed with a fluid outlet portion at one end by means of which it is detachably supported in the casing and having a bore through said portion leading from the open end of the block bore to the casing outlet, a screw extending through the opposite end of said frame, a rigid metal plate interposed between one end of said screw and one end face of the block and covering the other end of the block bore, and a pair of packing gaskets extending around opposite ends of the block bore, one of said gaskets being clamped between said plate and block and the other gasket being clamped between said block and that end of the frame formed with said outlet portion.

4. A filter comprising a casing having a fluild inlet and a fluid outlet, a filtering block in said casing having a bore extending entirely therethrough, and a clamping device within the casing and held thereto, in which the block is gripped and which is located entirely exteriorly of the block and its bore, said clamping device comprising a cover element larger than and covering one end of the block bore and two screw-threaded elements thread-coupled for relative adjustment longitudinally of the block bore, one of which thread-coupled elements presses said cover element and block toward an opposed portion of the other element which is provided with a fluid passage for connecting the other end of the block bore with the casing outlet.

5. A filter as claimed in claim 4, wherein sealing washers of electricity insulating material are clamped against opposite ends of the block around the ends of the block bore by said cover element and said opposed portion of one of said thread-coupled elements, respectively.

6. A filter as claimed in claim 4, wherein a fluid sealing washer is clamped between and telescopically interfitted with the block and said opposed portion of the last-mentioned element, a second fluid sealing washer is clamped between and telescopically interfitted with said cover element and the block, and said cover element and the thread-coupled element engaged therewith are interfitted to prevent edgewise movement of the cover element relatively to said thread-coupled element.

7. A filter as claimed in claim 4, wherein the thread-coupled element having the fluid passage is detachably held to the casing, which casing has an opening through which said thread-coupled elements are removable and insertable with the block clamped therebetween, and also has a cover element for closing said opening.

8. A filter comprising a casing, a filtering block in said casing having a vertical bore extending entirely therethrough, an upstanding rigid frame in said casing entirely exteriorly of the block and block bore and secured to the casing, said frame having upper and lower end portions extending respectively over and under said block, the lower end portion having a fluid passage therethrough leading to its upper face and registering with the lower end of the block bore, said casing having two fluid passages opening thereinto one of which opens directly into the casing and the other of which is directly open only to the fluid passage through the lower end portion of the frame, a packing gasket interposed between the bottom face of the block and upper face of the lower end portion of the frame around the adjacent ends of the block bore and frame passage, a rigid closure plate overlying the upper end of the block bore, a packing gasket interposed between said plate and the top face of the block, and vertically adjustable means carried by the upper end portion of the frame for pressing downward said plate to clamp the block in the frame and maintain the block bore tightly sealed at its ends from the interior of the casing.

9. A filter as claimed in claim 8, wherein the casing comprises an open top receptacle and a cover therefor movable from receptacle closing position, and said frame is detachably connected with the receptacle and is insertable and removable through the open top of the receptacle with the block held therein.

10. A filter as claimed in claim 8, wherein the frame is a one-piece frame having upper and lower end portions connected by uprights, and the vertically adjustable means is a screw threaded vertically through the upper end portion of the frame above said closure plate.

11. A filter as claimed in claim 8, wherein said block is entirely spaced from said frame and plate and vertically adjustable means, and wherein said gaskets are formed of material non-conductive of electricity.

12. A filter as claimed in claim 8, wherein said block is maintained in spaced relation with the frame and plate by said gaskets each of which has an annular flange telescoped in the block bore, and one of which is telescopically interfitted with the plate and the other with the lower end portion of the frame.

13. In a filter, the combination of an open top receptacle having a fluid passage through its bottom, a closure for the open top of said receptacle, an upstanding rigid frame in said receptacle having uprights and upper and lower connecting cross bars between which a filtering block is insertable, and a block clamping screw threaded downward through the upper cross bar of said frame, the lower cross bar having a central downward extension, said extension being detachably coupled with the receptacle and having a fluid passage extending therethrough to the upper face of the cross bar and communicating at its lower end with the fluid passage through the bottom of the receptacle to connect with the latter passage a bore in a filtering block clamped in the frame.

14. A filter comprising a casing having an inlet at its upper end and an outlet at its bottom, a filter block in said casing having a bore extending vertically into the block and opening at its lower end through the bottom of the said block, and a clamping device within the casing and held thereto, in which the block is gripped and which is located entirely exteriorly of the block and its bore, said clamping device comprising a frame, an upper element to press against the top of the block, a pressure-clamping means mounted in the top of the said frame to engage the said upper clamp element, a washer of material non-conductive of electricity interposed between the bottom of the filter block and the lower part of said frame and surrounding a fluid outlet passage through said frame, said washer sealing said passage from direct communication with the interior of the casing and forming a direct fluid connection between said outlet passage and the said bore of said block, and means to connect the frame of the clamping device to the bottom of the casing to support it and the block, and to place the outlet passage of the said frame in communication with the outlet passage of the casing.

In testimony whereof I hereunto affix my signature.

OSCAR HENNINGS.